US011157903B2

(12) United States Patent
Geraud (10) Patent No.: US 11,157,903 B2
(45) Date of Patent: Oct. 26, 2021

(54) METHOD FOR SUPPLYING DATA ON A PAYMENT TRANSACTION, CORRESPONDING DEVICE AND PROGRAM

(71) Applicant: INGENICO GROUP, Paris (FR)

(72) Inventor: Rémi Geraud, Paris (FR)

(*) Notice: Subject to any disclaimer, the term of this patent is extended or adjusted under 35 U.S.C. 154(b) by 831 days.

(21) Appl. No.: 15/609,259

(22) Filed: May 31, 2017

(65) Prior Publication Data
US 2017/0352035 A1    Dec. 7, 2017

(30) Foreign Application Priority Data

Jun. 3, 2016  (FR) ..................... 1655065

(51) Int. Cl.
*G06Q 20/40* (2012.01)
*G06Q 20/32* (2012.01)

(52) U.S. Cl.
CPC ...... *G06Q 20/401* (2013.01); *G06Q 20/3276* (2013.01); *G06Q 20/3278* (2013.01)

(58) Field of Classification Search
CPC .. G06Q 20/10; G06Q 20/102; G06Q 20/3278; G06Q 20/40; G06Q 20/085; G06Q 20/20; G06Q 20/227; G06Q 20/32; G06Q 20/382
USPC ........ 705/2, 16, 21, 39, 40, 80, 17; 235/440, 235/383; 370/437
See application file for complete search history.

(56) References Cited

U.S. PATENT DOCUMENTS

| | | | | |
|---|---|---|---|---|
| 2002/0194121 A1* | 12/2002 | Takayama | ............ | G06Q 20/204 705/39 |
| 2005/0004868 A1* | 1/2005 | Klatt | ................... | G06Q 20/04 705/40 |
| 2007/0118486 A1* | 5/2007 | Burchetta | .......... | G06Q 30/0641 705/80 |
| 2011/0280258 A1* | 11/2011 | Klingen | ............. | H04L 41/0816 370/437 |
| 2012/0022957 A1* | 1/2012 | Sun | ........................ | G06Q 20/40 705/16 |

(Continued)

FOREIGN PATENT DOCUMENTS

| | | |
|---|---|---|
| FR | 3018027 A1 | 8/2015 |
| GB | 2526518 A | 12/2015 |
| WO | 2016075396 A1 | 5/2016 |

*Primary Examiner* — Alexander G Kalinowski
*Assistant Examiner* — Sanjeev Malhotra
(74) *Attorney, Agent, or Firm* — Benoit & Côté Inc.

(57) ABSTRACT

The invention concerns a method for supplying data relating to a payment transaction to a communications terminal. A payment device capable of carrying out a payment transaction with said communications terminal, according to at least two distinct payment transaction modes, generates (E21) a first signal relating to a first payment transaction mode, said first signal comprising at least one piece of information making it possible to set up the payment transaction via a first communications channel, and sends (E23) said first signal, via said first communications terminal. Then, the payment device generates (E22) at least one second signal relating to a second payment transaction mode, said second signal comprising at least one piece of information making it possible to set up the payment transaction via a second communications channel, and sends (E24) the second signal, simultaneously with the sending of the first signal.

2 Claims, 2 Drawing Sheets

(56) References Cited

U.S. PATENT DOCUMENTS

| | | | | |
|---|---|---|---|---|
| 2013/0006847 | A1* | 1/2013 | Hammad | G06Q 20/382 |
| | | | | 705/39 |
| 2013/0334308 | A1* | 12/2013 | Priebatsch | G06Q 90/00 |
| | | | | 235/383 |
| 2014/0122328 | A1* | 5/2014 | Grigg | G06Q 20/3276 |
| | | | | 705/40 |
| 2015/0039455 | A1* | 2/2015 | Luciani | G06Q 20/20 |
| | | | | 705/17 |
| 2015/0206128 | A1* | 7/2015 | Torossian | G06Q 20/327 |
| | | | | 705/21 |
| 2015/0294084 | A1* | 10/2015 | McCauley | G16H 80/00 |
| | | | | 705/2 |
| 2015/0347789 | A1* | 12/2015 | Berthiaud | G06K 7/087 |
| | | | | 235/440 |
| 2016/0034880 | A1* | 2/2016 | Roberts | G06Q 20/202 |
| | | | | 705/21 |
| 2017/0011370 | A1* | 1/2017 | Mestre | G06Q 20/102 |
| 2017/0017958 | A1* | 1/2017 | Scott | G06Q 20/36 |
| 2017/0024720 | A1* | 1/2017 | Shah | G06Q 20/322 |
| 2017/0140385 | A1* | 5/2017 | Dobson | G06Q 20/405 |
| 2017/0169497 | A1* | 6/2017 | Lee | G06Q 30/0631 |
| 2017/0214132 | A1* | 7/2017 | Jeon | H01Q 1/38 |
| 2018/0096350 | A1* | 4/2018 | Groarke | G06Q 20/02 |
| 2018/0144337 | A1* | 5/2018 | Maniar | G06Q 20/322 |
| 2019/0114618 | A1* | 4/2019 | Zhao | G06Q 20/3278 |

\* cited by examiner

METHOD FOR SUPPLYING DATA ON A PAYMENT TRANSACTION, CORRESPONDING DEVICE AND PROGRAM

BACKGROUND OF THE INVENTION

Field of the Invention

The invention relates to the field of user authentication. The technique relates more particularly to the authentication of users in the context of payment operations and of access to goods or services.

Description of the Related Art

For some years now, the techniques for carrying out payment transactions have been profoundly modified, chiefly because of the rapid development of mobile terminal payment solutions. Indeed, mobile communications terminals (also called smartphones) have evolved into real pocket computers with computation power and processing capacities equivalent to those of office computers. Thus, using electronic wallets hosted on a communications terminal, a payment transaction can be carried out directly from this communications terminal.

Most merchants have payment terminals supporting at least one payment technology via a communications terminal. Such a payment technology uses, for example, NFC (Near Field Communication) between the payment terminal and the communications terminal to carry out the payment transaction. Another payment technology is for example based on the use of QR codes to transmit data to the communications terminal on the transaction to be made. The payment transaction is then made through a payment server.

In order to be able to propose payment transactions to the greatest number of users of communications terminals, most merchants have multimode payment terminals that enable the performance of payment transactions using several types of payment technologies.

When a user wishes to use his communications terminal to make a payment transaction using such a multimode payment terminal, the merchant, before initializing the transaction, must make a selection manually, on the payment terminal, of a payment transaction mode in which the payment transaction will be made.

In the prior art, depending on the characteristics of the communications terminal, the merchant can select a payment transaction mode (NFC or QR code) on the payment terminal in order to make a transaction. In practice, since the merchant is not an expert in communications terminals, a default payment transaction mode is selected by the merchant or by the maker of the payment terminal. In general, this default mode is the QR code transaction mode. A communications terminal that does not have this transaction payment mode but has another transaction payment mode also supported by the payment terminal then cannot make a payment transaction with the payment terminal. The user of a communications terminal must then use another payment mode (bank card, cash, check, etc.) to pay the merchant, or he must even abandon his purchase.

In addition, when the communications terminal supports several payment technologies, for example NFC and QR code, the user of the communications terminal does not always know which are the payment transactions available in his communications terminal, nor does he know the most appropriate mode for making the transaction.

SUMMARY OF THE INVENTION

The invention seeks to make improvements in the prior art. It relates to a method for supplying data relating to a payment transaction, to a communications terminal, implemented by a payment device capable of carrying out a payment transaction with said communications terminal, according to at least two distinct payment transaction modes. Such a method comprises:
  a step for generating a first signal relating to a first payment transaction mode, said first signal comprising at least one piece of information making it possible to set up the payment transaction via a first communications channel,
  a step for sending the first signal, via said first communications terminal.

The method also comprises the following steps:
  generating at least one second signal relating to a second payment transaction mode, said second signal comprising at least one piece of information making it possible to set up the payment transactions via a second communications channel,
  sending the second signal, simultaneously with the sending of the first signal.

The method for supplying thus simplifies the use of a multimode payment mode for the merchant. Such a multimode payment device is a payment device capable of making a payment transaction with a communications terminal according to at least two distinct payment transaction modes. For example, one payment transaction mode corresponds to a contactless payment technology using NFC type communications or to a QR code payment technology. The invention applies of course to other payment technologies.

A user's communications terminal can then use the first signal or the second signal sent out by the payment device to make the payment transaction according to the characteristics of the communications terminal, and especially according to the payment transaction mode supported by the payment application implemented in the communications terminal.

The different modes or characteristics of embodiments mentioned here below can be added, independently or in combination with one another, to the characteristics of the method for supplying defined here above.

According to one particular embodiment of the invention, said second signal is a 2D visual code and the step for sending the second signal corresponds to a display of said 2D visual code on a screen of the payment device.

According to this particular embodiment of the invention, the 2D visual code is for example a QR (or Quick Response) code. A communications terminal can thus scan the 2D visual code from the screen of the payment device to make the transaction, for example when the communications terminal is not adapted to processing the first signal sent out by the payment device via the first communications terminal. The payment transaction is then made via the second communications channel which, in this example, is the communications network, for example the Internet.

According to another particular embodiment of the invention, said second signal comprises a piece of information representing the sending of said first signal.

This particular embodiment of the invention thus makes it possible to inform the communications terminal and the user of such a terminal about the presence of the first signal. For example, when the first signal is an NFC signal sent out by the payment device, and the payment application of the communications terminal supports both payment transaction modes or when the communications terminal supports two payment applications respectively implementing the first and the second payment transaction mode, the communications terminal or the user can then choose the best suited payment transaction mode, for example the fastest or most secure mode.

Or else, if the user's communications terminal supports the first transaction mode but not the second transaction mode, the user can abandon the idea of making the payment transaction via his communications terminal because he sees only the second signal which is a visual signal. This particular embodiment of the invention informs the user (or the communications terminal directly) that the payment device is a multimode device and supports both modes of payment transaction. Thus, the user is encouraged to use the first mode of payment transaction.

According to another particular embodiment of the invention, the method for supplying further comprises a step for receiving a response signal via a first or second communications channel.

The invention also relates to a payment device capable of making a payment transaction with a communications terminal according to at least two distinct payment transaction modes. Such a device comprises:
  a first module for generating signals, adapted to generating a first signal relating to a first payment transaction mode, said first signal comprising at least one piece of information making it possible to set up the payment transaction via a first communications channel,
  a first module for sending, adapted to sending said first signal, via said first communications terminal,
  at least one second module for generating signals, adapted to generating a second signal relating to a second payment transaction mode, said second signal comprising at least one piece of information making it possible to set up the transaction via a second communications channel,
  a second module for sending, adapted to sending said second signal, said second module for sending being activated simultaneously with said first module for sending.

The different modes or characteristics of embodiments mentioned here below can be added, independently or in combination with one another, to the characteristics of the payment device defined here above.

According to one particular embodiment of the invention, the second module for generating a signal is adapted to generating said second signal in the form of a 2D visual code, comprising a piece of information representing the sending of said first signal.

The invention also relates to a payment terminal comprising a device according to any one of the embodiments described here above.

Another aspect of the invention relates to a method for selecting a payment transaction mode to make a payment transaction initiated by a payment device. Such a method is implemented by a communications terminal, and comprises the following steps:
  receiving at least one signal relating to the payment transaction coming from the payment device, said payment device being capable of implementing at least two payment transaction modes,
  obtaining, from said signal, at least one first piece of information indicating a first possible payment transaction mode for making the payment transaction with the payment device,
  obtaining at least one second piece of information indicating a second possible payment transaction mode for making the payment transaction with the payment device,
  selecting a payment transaction mode to be used to make the payment transaction with the payment device, from the first and the second payment transaction mode, on the basis of at least one characteristic of said communications terminal and of one characteristic of the payment transaction,
  sending a response, via a communications channel associated with the selected payment transaction mode, to the payment device.

According to the invention, the method for selecting thus enables the selection of a payment transaction mode to make the payment transaction with the payment device when the communications terminal is adapted to supporting several payment transaction modes.

The different modes or characteristics of embodiments mentioned here below can be added, independently or in combination with one another, to the characteristics of the payment device defined here above.

According to one particular embodiment of the invention, the step for obtaining at least one second piece of information indicating a second payment transaction mode corresponds to the reception of a signal sent out by the payment device via a short-range communications channel.

According to this particular embodiment of the invention, the communications terminal receives a short-range signal, for example an NFC signal, sent out by the payment device and therefore immediately detects the possibility of a second possible payment transaction mode.

According to another particular embodiment of the invention, the second piece of information indicating a second payment transaction mode is obtained from the received signal.

According to this particular embodiment of the invention, the signal received by the communications terminal comprises the second piece of information relating to a payment transaction mode.

Advantageously, the user of the communications terminal is informed of the possibility of using a second payment transaction mode. For example, when the payment application of the communications terminal has not detected a second signal, for example an NFC signal sent out by the payment device, the NFC payment transaction mode is not activated on the communications terminal. If the received signal is a QR code signal comprising a piece of visual information or a piece of information encoded in QR code indicating the sending of an NFC signal, the user of the communications terminal can activate the NFC payment transaction mode on his terminal in addition to the QR code payment transaction mode. Or else the communications terminal activates such a mode following the detection of the piece of information indicating the sending of an NFC signal by the payment device in QR code. The communications terminal can then select the most appropriate payment transaction mode.

According to another particular embodiment of the invention, the characteristic of the payment transaction corresponds to an amount of the transaction.

Advantageously, the transaction mode is selected as a function of the amount in the transaction. For example, it can be advantageous to use a transaction mode requiring a payment server when the amount is above a predetermined threshold, for example twenty Euros, in order to be able to make additional checks with the user's bank during the payment transaction and ensure payment to the merchant.

Correlatively, the invention also relates to a communications terminal adapted to selecting a payment transaction mode in order to carry out a payment transaction initiated by a payment device. Such a communications terminal comprises:
- means for receiving at least one signal relating to the payment transaction coming from the payment device, said payment device being capable of implementing at least two payment transaction modes,
- means for obtaining, from said signal, at least one first piece of information indicating a first possible payment transaction mode for making the payment transaction with the payment device,
- means for obtaining at least one second piece of information indicating a second possible payment transaction mode for making the payment transaction with the payment device,
- means for selecting a payment transaction mode to be used to make the payment transaction with the payment device, from the first and the second payment transaction modes, on the basis of at least one characteristic of said communications terminal or from one characteristic of the payment transaction,
- means for sending a response, via a communications channel associated with the selected payment transaction mode, to the payment device.

The method for supplying and the method for selecting respectively, according to the invention, can be implemented in various ways, especially in wired or software form.

According to one particular embodiment of the invention, the method for supplying and the method for selecting respectively are implemented by a computer program. The invention also relates to a computer program comprising instructions for implementing the method for supplying and the method for selecting according to any one of the particular embodiments described here above when said program is executed by a processor. Such a program can use any programming language whatsoever. It can be downloaded from a communications network and/or recorded on a computer-readable medium.

This program can use any programming language whatsoever and be in the form of source code, object code or intermediate code between source code and object code such as in a partially compiled form or in any other desirable form whatsoever.

The invention is also aimed at supplying a recording medium or information medium readable by a data processor and comprising instructions of a program as mentioned here above. The recording media mentioned here above can be any entity or communications terminal whatsoever capable of storing the program. For example, the medium can comprise a storage means such as a ROM, for example, a CD ROM or microelectronic circuit ROM or again a magnetic recording means, for example a floppy disk or a hard disk drive. Furthermore, the recording media can correspond to a transmissible medium such as an electrical or optical signal that can be conveyed via an electrical or optical cable, by radio or by other means. The program according to the proposed technique can especially be uploaded to an Internet type network.

As an alternative, the recording media can correspond to an integrated circuit into which the program is incorporated, the circuit being adapted to executing or to being used in the execution of the methods in question.

BRIEF DESCRIPTION OF THE DRAWINGS

Other features and advantages of the invention shall appear more clearly from the following description of one particular embodiment, given by way of a simple illustratory and non-exhaustive example, and from the appended drawings, of which.

DETAILED DESCRIPTION

General Principle

The invention relates to a multimode electronic payment device, i.e. an electronic payment device adapted to carrying out payment transactions with a communications terminal according to different payment technologies. To make such payment transactions, it is not necessary for the communications terminal and the electronic payment device to be in physical contact. Such payment technologies can use either a communications channel of a short-range network (NFC, Bluetooth©, WIFI, etc), or a communications network such as the Internet.

Advantageously, the invention enables the simultaneous sending of at least two signals relating to one and the same payment transaction, each signal representing a different payment technology. Thus, the working of the multimode payment devices is simplified from the merchant's viewpoint and the performance of the transaction is also simplified for the user of a communications terminal who wishes to make the payment transaction via his communications terminal: the communications terminal can choose the technology that best suits him to make the payment.

In addition, the invention also simplifies the use of a communications terminal that supports several payment transaction modes, either by means of a same multimode payment application, or via several payment applications. Indeed, the invention enables a communications terminal to select a payment transaction mode when several payment transaction modes are available on the payment device.

This means that this technique enables the merchant, who has the multimode payment device available to him, to accept any type of payment, regardless of the technology used. Besides, such a payment terminal facilitates the performance of the transactions for the users: these users do not have to be concerned with knowing which payment technology they can use according to their model of terminal. Since several signals are sent concomitantly, the communications terminal (or the user) chooses that appropriate signal.

Depending on the embodiments, the payment transaction in itself can be done either directly by the payment device (if, for example, the communications terminal transmits payment data to the payment device), or by means of a payment server to which the communications terminal gets connected (in this case the signal sent—in duplicate— includes an address to which the communications terminal gets connected to make the payment). In this case, one or more pieces of authentication data are produced: these pieces of data serve for the verification of the authenticity of the link between the payment device and the transaction; these pieces of data also serve to identify the payment means used (it is, for example, an authentication code of the payment means).

Example of Implementation

Figure 1:
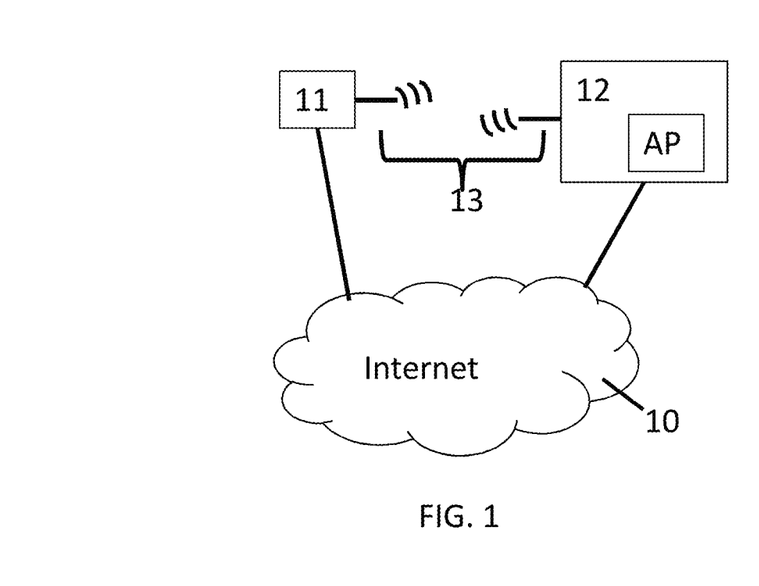
FIG. 1 presents an environment of implementation of the invention.

FIG. 1 presents an environment for implementing the invention according to one particular embodiment. In this example, a multimode electronic payment device 11 is placed in a merchant's establishment. A user wishes to make a payment with the merchant via his communications terminal 12. The communications terminal 12 is for example a smartphone type of mobile terminal.

The communications terminal 12 is capable of setting up communications via a communications network 10, such as the Internet, or a mobile IP data network to communicate with other communications terminals or servers also connected to the communications network.

An electronic payment application AP is installed on the communications terminal 12. The electronic payment application AP is adapted to making payment transactions according to at least one payment transaction mode. The term "payment transaction mode" is understood here to mean the electronic payment technology used by the communications terminal and the electronic payment device 11, and if necessary a payment server to communicate data on the transaction and the bank data of the user of the communications terminal. Such a payment technology is, for example, an NFC contactless payment technology or a QR code payment technology.

For the communications terminal 12 to be capable of carrying out payment transactions with a payment device 11, the user's authentication data and bank data have been recorded within the communications terminal 12 by the payment application provider, for example in the SIM card of the terminal in order to encrypt and secure such data.

According to a first example, the electronic payment application AP of the communications terminal 12 uses NFC payment technology to carry out payment transactions. According to this example, the communications terminal 12 therefore comprises an NFC transmission-reception module capable of communicating with the payment application AP.

The payment device 11 is suited to making payment transactions according to the NFC payment technology. Such an NFC payment technology constitutes a first payment transaction mode, as understood in the invention. Such an NFC payment technology uses a communications channel set up for the short range 13, of about ten centimeters. According to this payment technology, to carry out the payment transaction, the merchant initiates transactions on the payment device 11 by entering data on the transaction, for example the amount of the payment to be made. The electronic payment device 11 generates a signal according to an NFC protocol and waits to receive the user's bank data to be able to complete the payment transaction. The user of the communications terminal activates the payment application AP on his communications terminal 12 and brings the communications terminal 12 closer to the payment device 11. When the communications terminal 12 and the payment device 11 are sufficiently close to each other, about 5 to 10 cm, the payment application AP detects, via the NFC transmission-reception module, the NFC signal sent out by the payment device 11. Following this detection, the payment application AP commands the transmission, via the NFC transmission-reception module of the communications terminal 12, of the bank data stored in the communications terminal 12, to the payment device 11. The payment device 11 receives the user's bank data and memorizes it with the data on the payment transaction. The payment device 11 then communicates with a payment server of a financial institution to transmit the data of the payment transaction and obtain effective payment, i.e. so that the user's bank data is debited the amount of the transaction and the merchant's bank account is credited with the amount of the transaction.

Before closing the transaction with the communications terminal and requesting payment from the financial institution, the payment device 11 can, if necessary, ask the financial institution to authenticate the user of the communications terminal 11 in order to guarantee the validity of the payment transaction.

According to a second example, the electronic payment application AP of the communications terminal 12 uses the QR code payment technology to carry out the payment transaction. According to this example, the communications terminal 12 comprises a QR code capture module, for example a camera. The payment application AP is capable of communicating with the camera of the communications terminal 12 to obtain the image of the captured QR code and process such an image to obtain the encoded information contained in the QR code.

The payment device 11 is also adapted to making payment transactions according to the QR code payment technology. Such a QR code payment technology constitutes a second payment transaction mode, as understood in the invention.

A QR code is a 2D (two-dimensional) visual code comprising black and white pixels laid out in a defined frame, generally a square. The layout of the black and white pixels in the frame defines the information contained in the code. The advantage of a QR code is that the information that it contains can be rapidly decoded after it has been read by a code reader, or a camera.

According to the payment technology based on the use of a QR code, following the initializing of a payment transaction by the merchant on the electronic payment device 11, the electronic payment device 11 generates a QR code comprising data to identify the transaction to be made, identification data to identify the merchant or the payment device and data enabling a communications terminal to access a payment server via the communications network 10.

To make the payment transaction, the payment application AP of the communications terminal 12 scans the QR code displayed on the payment device 11, via the camera of the communications terminal 12. Then, the payment application AP of the communications terminal 12 decodes the scanned QR code and extracts decoded data: the address of the payment server (not shown) and the data on the transaction to be made (amount of the transaction, identification of the payment device and/or of the merchant).

Then, the payment application AP of the communications terminal 12 communicates with the payment server by means of the extracted address. During this communication, the payment application AP of the communications terminal 12 supplies the payment server with the extracted data relating to the transaction and the bank data of the user of the communications terminal 12 stored in the communications terminals 12. The payment server sends back the bank data received and the data relating to the transaction to the payment device 11 so that the payment device records the payment transaction with the bank data on the user of the communications terminal 12.

If necessary, depending on either of the examples described here above, the payment application AP of the communications terminal 12 can ask the user to enter a code, for example a PIN code, to authorize the payment transaction before sending the user's bank data.

Figure 2:
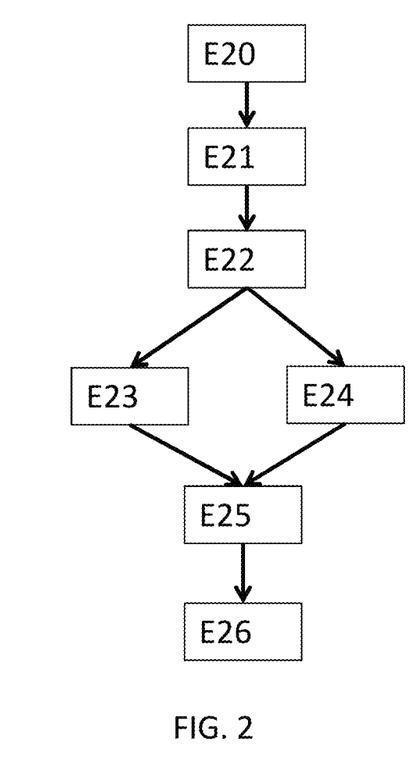
FIG. 2 illustrates the main steps of the method for supplying data relating to a payment transaction mode according to one embodiment of the invention.

FIG. 2 illustrates the main steps of the method for supplying data on a payment transaction according to one particular embodiment of the invention. In the prior art, when the merchant initiates the payment transaction on the payment device 11, the payment device 11 generates only one signal intended for the communications terminal 12. The generated signal depends on the transaction mode that has been selected by the merchant or that has been selected by default by the provider of the payment device 11. In the embodiment described here, the communications terminal 12 supports only one payment transaction mode.

According to the particular embodiment described here, during a step E20, the merchant initiates, on the payment device 11, the payment transaction to be made with the communications terminal 12.

Following the initialization at the step E20, during a step E21, the payment device 11 generates an NFC signal comprising a piece of information by which the payment transaction can be made via a short-range NFC communications channel 13. For example, the generated signal comprises a piece of authentication data enabling the communications terminal 12 to get authenticated with the payment device 11 (or to transmit bank-card type payment data).

Following the initialization at the step E20, at a step E22, the payment device 11 also generates a QR code signal. The QR code signal comprises especially a piece of information that makes it possible to establish the transaction via the communications network 10. The QR code signal comprises the address of the payment server with which the communications terminal must get authenticated and data on the payment transaction (such as data on the amount of the transaction and bank account data) enabling the communications terminal 12 to get authenticated.

In a step E23, the payment device 11 sends out the signal generated at the step E21 via the NFC communications channel 13. Concomitantly with the step E23, during a step E24, the payment device 11 sends out the QR code generated during the step E22. During the step E24, the payment device 11 displays the generated QR code on its screen.

According to one first example, when the payment application AP of the communications terminal 12 supports the NFC payment transaction mode, the user of the communications terminal brings the communications terminal 12 closer to the payment device 11 in order to complete the payment transaction. The communications terminal 12 detects the NFC signal sent out during the step E23, extracts the piece of data for authenticating the transaction from the NFC signal and sends out the extracted authentication data and the user's bank data to the payment device 11.

At a step E25, the payment device 11 receives these pieces of information on the NFC communications channel.

As an alternative, the communications terminal can also link up to a payment server, the address of which is indicated in the NFC signal, and effect the payment from this server. At the step E25, the payment device 11 then receives a confirmation of payment coming from the payment server.

According to a second example, when the payment application AP of the communications terminal 12 supports the QR code payment transaction mode, the user of the communications terminal positions the communications terminal 12 so as to capture the QR code displayed by the payment device 11. The communications terminal 12 captures (i.e. scans or flashes) the QR code displayed at the step E24. The communications terminal 12 decodes the scanned QR code and, from the decoded data, it extracts the piece of data for authenticating the transaction and the address of the payment server. The communications terminal 12 communicates with the payment server via the communications network 10, and transmits the extracted piece of authentication data and the user's bank data to the payment server. The payment server then carries out the payment transaction (with the data that it receives from the communications terminal, for example the payment card data) and, via the communications network 10, transmits a confirmation of payment to the payment device 11.

At the step E25, the payment device 11 therefore receives a confirmation of payment (including the previously transmitted piece of authentication data) from the payment server, via the communications network 10.

During the step E26, the payment device 11 authenticates the confirmation of payment received, by verifying that the piece of authentication data received truly corresponds to the authentication data sent out via the NFC signal or the encoded QR signal for the transaction initialized during the step E20. After the authentication, the payment device 11 records the information received during the step E25 in order to complete the payment transaction.

When the payment transaction is completed, the payment device 11 stops the sending of the NFC signal and the display of the QR code.

The method of the invention has been described for the case where the payment device supports the NFC payment technology and the QR code payment technology. Other embodiments are possible, for example when the payment device supports an ultrasound-based payment technology. In this example, the ultrasound signal is transmitted, for example, with an additional voice component, in parallel with the NFC signal for example, in order to inform the user (and the communications terminal) that the payment device 11 supports the NFC payment technology.

Figure 3:
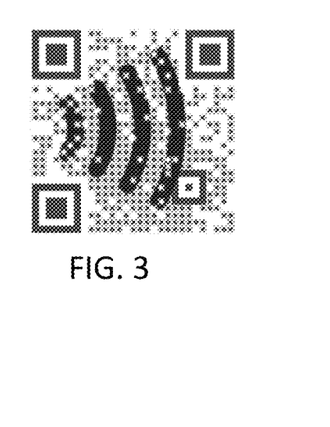
FIG. 3 represents a signal relating to a payment transaction mode sent according to one particular embodiment of the invention.

FIG. 3 represents a signal pertaining to a payment transaction mode sent out according to one particular embodiment of the invention. FIG. 3 represents a QR code generated for example by the payment device 11 at the step E22 described with reference to FIG. 2 and sent out by the payment device 11 at the step E24.

According to the particular embodiment described here, the QR code includes an NFC logo. Such a QR code thus comprises a piece of information representing the sending of the NFC signal by the payment device 11. The QR code remains perfectly readable and interpretable by the camera of the communications terminal 12 and the payment application AP when the payment application AP supports the QR code payment technology.

The QR code of FIG. 3 is used to inform the user that the payment device 11 is a multimode device and supports both the NFC payment technology and the QR code payment technology. For example, when the user's communications terminal 12 supports the NFC payment technology but not the QR code technology, the user can decide to abandon making the payment transaction via his communications terminal 12 because the display of the QR code by the payment device 11 informs him that the QR code payment technology is supported but he has no information whatsoever about the NFC payment technology.

The QR code comprising a piece of information representing the sending of the NFC signal sent out by the payment device 11, and as shown in FIG. 3, makes it possible to inform the user (or the communications terminal directly) that the payment device 11 is a multimode device and supports two modes of payment transaction. Thus, the user of the communications terminal 12 is encouraged to use the NFC payment technology even if a QR code is displayed by the payment device 11.

According to this particular embodiment of the invention, after the display of such a QR code during the step E24, the user of the communications terminal 12 brings his communications terminal 12 closer to the payment device 11 in order to complete the payment transactions initialized as described with reference to FIG. 2.

Figure 4:
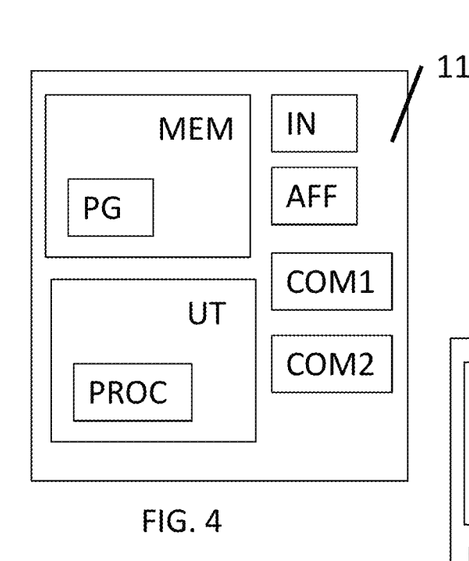
FIG. 4 presents the simplified structure of a payment device according to one embodiment of the invention.

FIG. 4 presents the simplified structure of a payment device 11 according to one particular embodiment of the invention. Such a payment device 11 comprises a memory MEM, a processing unit UT, equipped for example with a microprocessor PROC, and driven by the computer program PG stored in the memory MEM. The computer program PG comprises instructions to implement the steps of the method for supplying as described with reference to FIG. 2 when the program is executed by the processor PROC.

At initialization, the code instructions of the computer program PG are for example loaded into a memory RAM and then executed by the processor PROC. The processor PROC of the processing unit UT especially implements the steps of the method for supplying described with reference to FIG. 2, according to the instructions of the computer program PG.

To this end, the payment device 11 comprises an NFC sending-receiving interface COM1 capable of sending an NFC signal on command from the PROC processor of the processing unit UT according to the instructions of the computer program PG.

The payment device 11 also comprises an interface COM2 capable of communicating with the communications network 10, and especially of receiving data relating to payment transactions.

The payment device 11 comprises a screen AFF capable of displaying a 2D visual code such as a QR code. Classically, the payment device 11 also comprises a user interaction interface IN capable of receiving commands from the merchant and transmitting them to the processor PROC of the processing unit UT. Such an interface is, for example, a keypad, a touchscreen. The interface COM1, the interface COM2, the screen AFF and the interface IN are driven by the processor PROC of the processing unit PG according to the instructions of the computer program PG.

According to one particular embodiment of the invention, the payment device 11 is included in a payment terminal.

Figure 5:
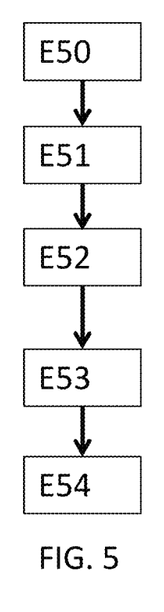
FIG. 5 presents the main steps of the method for selecting a payment transaction mode according to one particular embodiment de the invention.

FIG. 5 presents the main steps of the method for selecting a payment transaction mode according to one particular embodiment of the invention. In this embodiment of the invention, the communications terminal 12 is capable of making a payment transaction with the payment device 11 according to two distinct payment transaction modes, for example one transaction mode using NFC payment technology and one transaction mode using QR code payment technology.

At a step E50, the communications terminal 12 receives a signal relating to the payment transactions sent out by the payment device 11. Such a signal corresponds for example to an image of a QR code scanned by the camera of the communications terminal 12. According to another example, when the payment device is adapted to making payment transactions via a technology based on ultrasound, the signal corresponds to an ultrasonic signal sent out by the payment device.

At a step E51, the communications terminal obtains a piece of information, from the signal received during the step E50, informing the communications terminal that the transaction initiated by the payment device 11 can be made according to a first payment transaction mode. When the received signal is an image of a QR code, the communications terminal decodes the QR code and, from the decoded data, extracts the authentication data for the transaction and the address of the payment server.

In a step E52, the communications terminal obtains a second piece of information indicating a second possible payment transaction mode to carry out the payment transactions with the payment device 11.

According to one variant, this piece of information is encoded in the QR code received during the step E50. The communications terminal then extracts decoded data from the QR code.

According to another variant, the QR code comprises a piece of visual information interpretable by the user of the communications terminal 12. Such a piece of visual information states that the payment device 11 supports another payment transaction mode. For example, the piece of visual information is included in a QR code as illustrated in FIG. 3. The visual information of the QR code indicates that an NFC payment transaction mode is possible.

According to one example of this variant, the user activates, on his communications terminal, the payment application relating to the NFC payment transaction mode.

According to another example of this variant, the communications terminal 12 analyzes the image of the QR code scanned at the step E50 and extracts the visual information included in the QR code. The communications terminal 12 then detects the fact that this information corresponds to an NFC logo, for example by comparison of the visual information extracted and images of the logo memorized in the communications terminal 12. The communications terminal 12 then activates the payment application relating to the NFC payment transaction mode and informs the user that this payment mode is activated.

According to another variant, the communications terminal 12 is close enough to the payment device 11 to detect the NFC signal sent out by the payment device 11 during the step E23 described with reference to FIG. 2. In this variant, the second piece of information indicating a second possible payment transaction mode is obtained from the NFC signal received by the communications terminal 12.

At a step E53, the communications terminal 12 selects a payment transaction mode to be used to make the payment transactions with the payment device 11. The selection is made between the QR code payment transaction mode and the NFC payment transaction mode that have been detected respectively during the steps E51 and E52. Such a selection of a payment transaction mode is done from at least one characteristic of said communications terminal 12 or from a characteristic of the payment transaction. For example, the NFC payment transaction mode is selected if the amount of the transaction is less than twenty Euros, and the QR code payment transaction mode is selected if the amount of the transaction is greater than or equal to twenty Euros.

According to another example, the NFC payment transaction mode is selected as a function of the communications network to which the communications terminal 12 is connected. For example, if the communications terminal 12 is connected to a 2G network, the communications terminal 12 selects an NFC payment transaction mode. If the communications terminal 12 is connected to a 3G/4G network, the communications terminal 12 selects a QR code payment transaction mode.

Following the selection of a payment transaction mode, the communications terminal 12, in a step E54, sends a response signal intended for the payment device 11, via the communications channel associated with the selected payment transaction mode.

To this end, when the selected payment transaction mode is an NFC transaction mode, if the communications terminal 12 has not yet detected the NFC signal sent out by the payment device 11, a piece of visual information is displayed by the communications terminal 12 to the user so that the user of the communications terminal 12 brings the communications terminal 12 closer to the payment device 11. Then, when the signal sent out by the payment device 11 at the step E23 is detected, the communications terminal 12 extracts the piece of data for authenticating the transaction from the NFC signal and sends out the extracted piece of authentication data and the user's bank data to the payment device 11 via an NFC channel.

When the selected payment transaction mode is a QR code transaction mode then at the step E54, the communications terminal 12 communicates with the payment server via the communications network 10 and transmits the extracted authentication data and the user's bank data to the payment server. The payment server transmits these pieces of information to the payment device 11 via the communications network 10.

Figure 6:
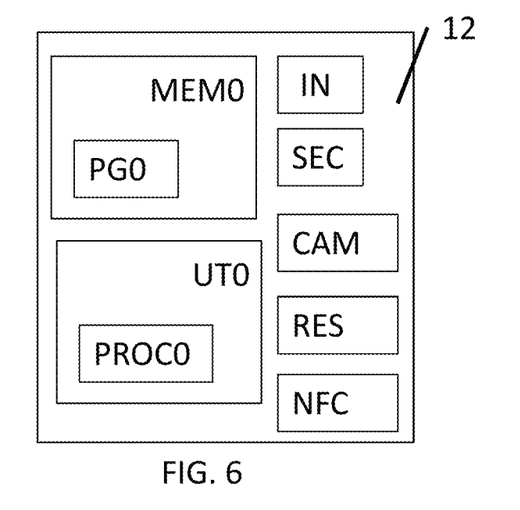
FIG. 6 presents the simplified structure of a communications terminal according to one embodiment of the invention.

FIG. 6 presents the simplified structure of a communications terminal according to one particular embodiment of the invention. Such a communications terminal 12 comprises a memory MEM0, a processing unit UT0, equipped for example with a microprocessor PROC0, and driven by the computer program PG0 stored in the memory MEM0. The computer program PG0 comprises instructions to implement the steps of the method for selecting as described with reference to FIG. 5 when the program is executed by the processor PROC0.

At initialization, the code instructions of the computer program PG0 are for example loaded into a memory RAM and then executed by the processor PROC0. The processor PROC0 of the processing unit UT0 especially implements the steps of the method for selecting described with reference to FIG. 2, according to the instructions of the computer program PG0.

To this end, the communications terminal 12 comprises an NFC sending-receiving interface capable of sending an NFC signal on command from the processor PROC0 of the processing unit UT0 according to the instructions of the computer program PG0.

The communications terminal 12 also comprises an interface RES capable of communicating with the communications network 10, and especially of sending data on payment transaction to a payment server of the communications network 10.

The communications terminal 12 comprises a visual capture module CAM such as a camera or a barcode reader, to capture a 2D visual code such as a QR code.

Classically, the communications terminal 12 also comprises a user interaction interface IN capable of receiving commands from the user, and transmitting them to the processor PROC0 of the processing unit UT0. Such an interface is, for example, a keypad or a touchscreen. If necessary, the communications terminal 12 also comprises a screen.

The communications terminal 12 also comprises a secured storage module SEC, for example a SIM card, capable of recording the bank data of the user of the communications terminal 12. The memory MEM0 also comprises at least one payment application AP in software form. The payment application AP is adapted to communicating with the secured storage module SEC to obtain the bank data during a payment transaction. The NFC interface and the RES interface are driven by the processor PROC0 of the processing unit PG0 according to the instructions of the computer program PG0.

The communications terminal 12 is for example a mobile telephone, a smartphone, a tablet etc.

The invention claimed is:

1. Method for supplying data relating to a payment transaction, to a communications terminal, implemented by a payment device capable of carrying out a payment transaction with said communications terminal, according to at least two distinct payment transaction modes, including a Near Field Communication (NFC) contactless payment technology and a Quick Response (QR) code payment technology, the method comprising:
   generating a first NFC signal relating to a first payment transaction mode, said first NFC signal comprising at least one piece of information making it possible to set up the payment transaction with said communications terminal via a first communications channel,
   sending the first NFC signal, via said first communications channel,
   generating a second signal relating to a second payment transaction mode, said second signal being a 2D visual code corresponding to said QR code payment technology and comprising at least one piece of information making it possible to set up the payment transaction with said communications terminal via a second communications channel, said second signal comprising a piece of information representing the sending of said first signal,
   displaying said 2D visual code on a screen of the payment device simultaneously with the sending of the first signal, and
   completing the payment transaction in response to a selection of one of the first and second signals by the communications terminal.

2. Method for supplying according to claim 1, further comprising a step for receiving a response signal via the first or second communications channel.

* * * * *